United States Patent
Netz et al.

(10) Patent No.: US 10,977,248 B2
(45) Date of Patent: Apr. 13, 2021

(54) PROCESSING RECORDS IN DYNAMIC RANGES

(71) Applicant: Microsoft Technology Licensing, LLC, Redmond, WA (US)

(72) Inventors: Amir Netz, Bellevue, WA (US); Cristain Petculescu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 15/936,136

(22) Filed: Mar. 26, 2018

(65) Prior Publication Data

US 2018/0260438 A1 Sep. 13, 2018

Related U.S. Application Data

(63) Continuation of application No. 14/805,349, filed on Jul. 21, 2015, now Pat. No. 9,928,276, which is a (Continued)

(51) Int. Cl.
*G06F 16/00* (2019.01)
*G06F 16/2453* (2019.01)
*G06F 16/242* (2019.01)

(52) U.S. Cl.
CPC ...... *G06F 16/24537* (2019.01); *G06F 16/244* (2019.01)

(58) Field of Classification Search
CPC .............. G06F 16/278; G06F 16/2282; G06F 16/24537; G06F 16/211; G06F 16/27; G06F 16/24554; G06F 16/215; G06F 16/24544; G06F 16/284; G06F 11/2094; G06F 16/221; G06F 16/2255; G06F 11/1425; G06F 11/2097; G06F 16/21; G06F 16/217;
(Continued)

(56) References Cited

U.S. PATENT DOCUMENTS 5,832,475 A 11/1998 Agrawal et al.
6,269,357 B1 7/2001 Nakayama et al.
(Continued)

OTHER PUBLICATIONS

"Understanding Hash Joins", Retrieved from: https://web.archive.org/web/20101126021649/http://msdn.microsoft.com/en-us/library/aa178403(SQL.80).aspx, Retrieved on: Nov. 23, 2010, 2 Pages.
(Continued)

*Primary Examiner* — Yicun Wu
(74) *Attorney, Agent, or Firm* — Davin Chin; Chin IP, PLLC

(57) ABSTRACT

A scalable analysis system is described herein that performs common data analysis operations such as distinct counts and data grouping in a more scalable and efficient manner. The system allows distinct counts and data grouping to be applied to large datasets with predictable growth in the cost of the operation. The system dynamically partitions data based on the actual data distribution, which provides both scalability and uncompromised performance. The system sets a budget of available memory or other resources to use for the operation. As the operation progresses, the system determines whether the budget of memory is nearing exhaustion. Upon detecting that the memory used is near the limit, the system dynamically partitions the data. If the system still detects memory pressure, then the system partitions again, until a partition level is identified that fits within the memory budget.

20 Claims, 4 Drawing Sheets

Related U.S. Application Data continuation of application No. 13/092,978, filed on Apr. 25, 2011, now Pat. No. 9,087,094.

(58) Field of Classification Search
CPC .......... G06F 16/2379; G06F 16/24552; G06F 16/2456; G06F 16/254
See application file for complete search history.

(56) References Cited

U.S. PATENT DOCUMENTS

| | | | |
|---|---|---|---|
| 6,269,375 | B1 | 7/2001 | Ruddy et al. |
| 7,266,823 | B2 | 9/2007 | Alford, Jr. |
| 7,469,241 | B2 | 12/2008 | Bellamkonda et al. |
| 7,562,090 | B2 | 7/2009 | Lohman et al. |
| 7,698,252 | B2 | 4/2010 | Saus |
| 7,917,512 | B2 | 3/2011 | Bhide et al. |
| 2010/0088315 | A1 | 4/2010 | Netz et al. |

OTHER PUBLICATIONS

"Final Office Action Issued in U.S. Appl. No. 13/092,978", dated Aug. 30, 2013, 14 Pages.
"Final Office Action Issued in U.S. Appl. No. 13/092,978", dated Sep. 25, 2014, 13 Pages.
"Non Final Office Action Issued in U.S. Appl. No. 13/092,978", dated Jun. 12, 2014, 12 Pages.
"Non-Final Office Action Issued in U.S. Appl. No. 13/092,978", dated Mar. 1, 2013, 13 Pages.
"Notice of Allowance Issued in U.S. Appl. No. 13/092,978", dated Mar. 13, 2015, 9 Pages.
"Final Office Action Issued in U.S. Appl. No. 14/805,349", dated Jul. 28, 2017, 11 Pages.
"Non Final Office Action Issued in U.S. Appl. No. 14/805,349", dated Feb. 10, 2017, 14 Pages.
"Notice of Allowance Issued in U.S. Appl. No. 14/805,349", dated Nov. 17, 2017, 8 Pages.
Hassan, et al., "Performance Evaluation of a Parallel Algorithm for "Group By-Join" Queries Processing in Distributed Architectures", In Software and Data Technologies, Springer Berlin Heidelberg, 2007, 23 Pages.
Pieringer, et al., "Combining Hierarchy Encoding and Pre-Grouping: Intelligent Grouping in Star Join Processing", Retrieved from: http://www.dblab.ntua.gr/pubs/uploads/TR-2003-1.pdf, 2003, pp. 1-12.
Rani, et al., "New Parallel Sorting Algorithm Based on Partitioning and Redistribution", In Journal of Applied Sciences, vol. 8, No. 12, 2008, 3 Pages.
Rosch, et al., "Sample Synopses for Approximate Answering of Group-By Queries", In Proceedings of the 12th International Conference on Extending Database Technology: Advances in Database Technology, Mar. 26, 2009, 12 Pages.

PROCESSING RECORDS IN DYNAMIC RANGES

CROSS-REFERENCE TO RELATED APPLICATION(S)

This application is a continuation of U.S. patent application Ser. No. 14/805,349, filed Jul. 21, 2015, entitled "PROCESSING RECORDS IN DYNAMIC RANGES," which is a continuation of U.S. patent application Ser. No. 13/092,978, filed Apr. 25, 2011, entitled "PROCESSING RECORDS IN DYNAMIC RANGES,". The entirety of each of these afore-mentioned applications is incorporated herein by reference.

BACKGROUND

Databases are used to store and process data for a variety of tasks today. Businesses often use databases to manage customers, track sales, manage internal personnel and operations, and so forth. Business Intelligence (BI) refers to the use of databases or other systems to analyze a business. The analysis may include observing historical trends, projecting future performance, slicing collected information (e.g., sales by region or by month), and so on. Databases often provide query functionality that facilitates the implementation of business intelligence using data stored in a database and implemented by information technology (IT) or other personnel within a business.

Two common types of query operations are obtaining distinct counts of items in repetitive data and grouping data by some value. In terms of Structured Query Language (SQL), these operations are invoked by the "DISTINCT COUNT" and "GROUP BY" keywords. A distinct count can be used, for example, to determine how many distinct customers purchased products from a company during a period. Using a database table that contains a row for each purchase transaction and a column with a customer identifier, a distinct count on the customer identifier will return the total number of customers that had transactions matching any other criteria in the query (such as filtering conditions in the WHERE clause). Grouping collects related data together, and can be used to produce subtotals or other sub-collections of data within a larger collection. For example, using the same transactions table, a query can group transactions by region to obtain a revenue per region that contributes to the overall revenue represented in the table. These two concepts can also be used together, such as to obtain a distinct count of customers in each region.

The most common problems with counting and grouping operations are the computational complexity and corresponding time involved with producing the results. Determining a distinct count involves some level of tracking which values have been seen before so that additional data of that value can be ignored, and which values have not been seen so that the count can be incremented when new data values are encountered. Grouping data likewise involves tracking how many separate values of the grouped data value exist, and partitioning rows that are found based on the value of the grouped data value for each row. Performing these tasks may involve sorting the data, creating temporary tables, building hash tables, pushing large data structures to disk or other large (but slow) storage, and so forth. These operations are costly in terms of time and storage resources, and affect how large of a dataset can be used with such operations to achieve results in a reasonable period. In particular, datasets that have columns of high cardinality (i.e., many different values in the set) present computational difficulties for existing analysis systems.

SUMMARY

A scalable analysis system is described herein that performs common data analysis operations such as distinct counts and data grouping in a more scalable and efficient manner. The system allows distinct counts and data grouping to be applied to large datasets with predictable growth in the cost of the operation. The system dynamically partitions data based on the actual data distribution, which provides both scalability and uncompromised performance. In some embodiments, the scalable analysis system modifies an existing database infrastructure to allow columns to be declared as partitionable and to add a BETWEEN operator to the WHERE clause that allows specifying an upper and lower bound of data identifiers (where a data identifier identifies a row) for a particular query. Using these capabilities, the system begins with the assumption that a query will process the whole data set in one pass. The system sets a budget of available memory or other resources to use for the operation. As the operation progresses, the system determines whether the budget of memory is nearing exhaustion. Upon detecting that the memory used is near the limit, the system dynamically partitions the data. If the system still detects memory pressure, then the system partitions again, until a partition level is identified that fits within the memory budget.

After the system finishes processing the first partition, it complements the range values in the between operator and begins processing the remaining partition in the same manner. Depending on the values present in the remaining partition, it is possible that the system will not partition the data further (or conversely may partition the data to a further extent than the first partition). In this way, the partitioning is initially optimistic. If the data has low cardinality, the system may complete the query with no partitioning. For data with high cardinality, the system may complete the query piece by piece, creating and processing multiple partitions. The system can complete the operation in a manner that is most efficient for the actual data on which the operation is performed. Meanwhile, the resources consumed (e.g., memory) are predictable and local to the operation, allowing for fast processing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
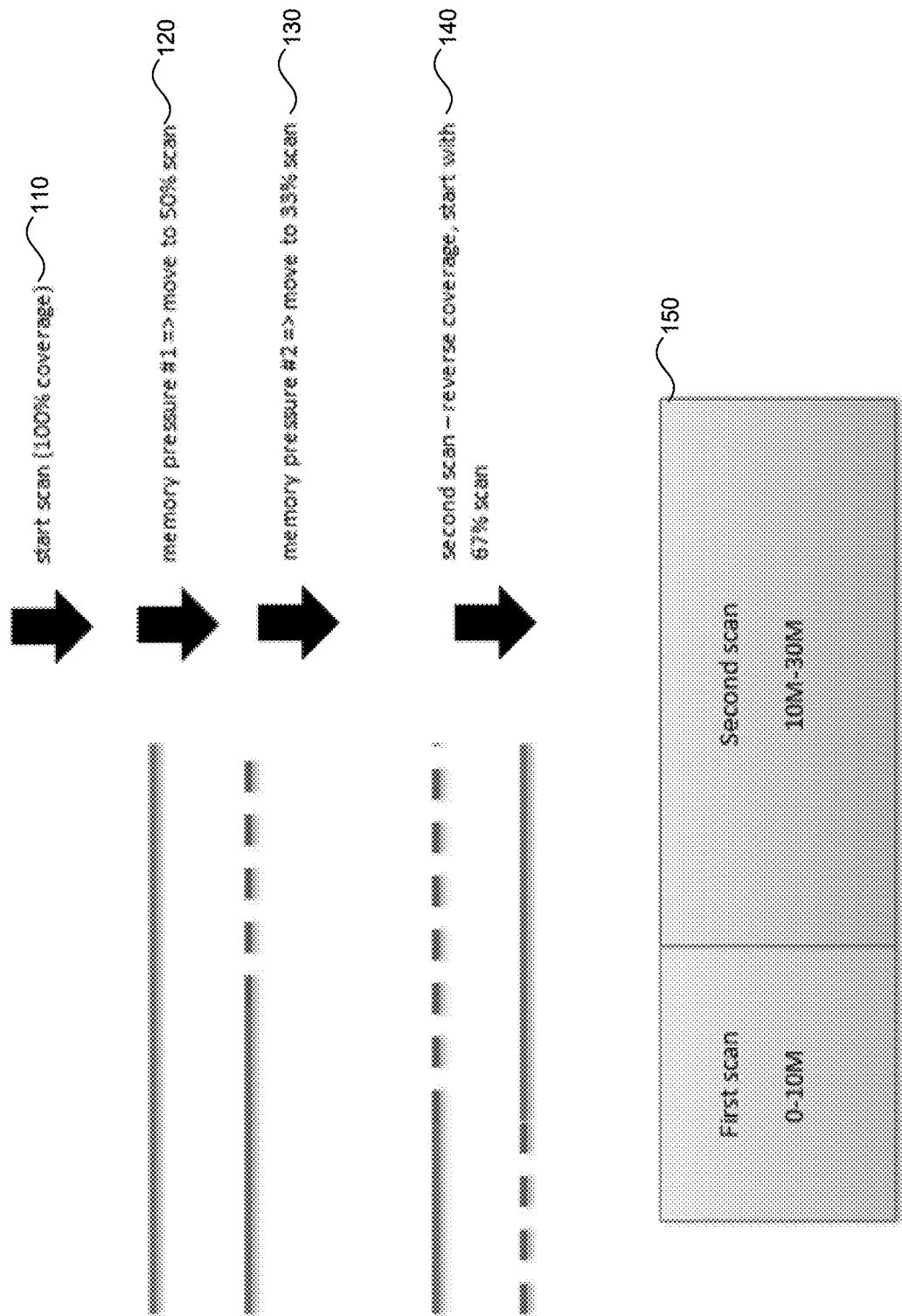
FIG. 1 is a diagram that graphically illustrates the first phase of the scanning performed by the scalable analysis system, in one embodiment.

A scalable analysis system is described herein that performs common data analysis operations such as distinct counts and data grouping in a more scalable and efficient manner. The system allows distinct counts and data grouping to be applied to large datasets with predictable growth in the cost of the operation. The classical strategy involves either partitioning (i.e., sorting) the data by the distinct count column(s) and forward-only traversing this data, with the disadvantage that sorting will involve extra time. A second common strategy is to build a hash table of all of the columns involved and then use the hash table as data input for the operation, with the disadvantage that the hash table is non-local and may spill onto disk (leading to thrashing and poor performance). The scalable analysis system solves this problem by using a multi-phase approach for grouping data (which is the first phase of a distinct count operation as well). The system dynamically partitions data based on the actual data distribution, which provides both scalability and uncompromised performance.

In some embodiments, the scalable analysis system modifies an existing database infrastructure to allow columns to be declared as partitionable and to add a BETWEEN operator to the WHERE clause that allows specifying an upper and lower bound of data identifiers (where a data identifier identifies a row) for a particular query. Using these capabilities, the system begins with the assumption that a query will process the whole data set in one pass (e.g., the BETWEEN operator specifies the lowest and highest available values, such as 0 and 30M for a table of 30M records). The system sets a budget of available memory to use for the operation. As the operation progresses, the system determines whether the budget of memory is nearing exhaustion (e.g., detecting memory pressure). For example, if the memory budget is 100 megabytes (MB), then the system may take note as the consumed memory approaches that limit. Upon detecting that the memory used is near the limit, the system dynamically partitions the data. For example, the system may initially partition the data in half, adjusting the upper bound of the BETWEEN operator to half the previous value. If the system still detects memory pressure, then the system partitions again (e.g., in thirds, so that the first one third of the records are being processed), until a partition level is identified that fits within the memory budget.

After the system finishes processing the first partition, it complements the range values in the between operator and begins processing the remaining partition in the same manner. Depending on the values present in the remaining partition, it is possible that the system will not partition the data further (or conversely may partition the data to a further extent than the first partition). Using the previous example, the system may process records 10M to 30M in one pass. In this way, the partitioning is initially optimistic. If the data has low cardinality, the system may complete the query with no partitioning. For data with high cardinality, the system may complete the query piece by piece, creating and processing multiple partitions. The system can complete the operation in a manner that is most efficient for the actual data on which the operation is performed. Meanwhile, the resources consumed (e.g., memory) are predictable and local to the operation, allowing for fast processing. Thus, the scalable analysis system performs scalable and efficient distinct count and grouping operations regardless of the dataset or distribution of the data.

In some embodiments, the scalable analysis system evaluates the conditions for partitioning every N records. When the condition is evaluated, if the data meets the conditions for partitioning (e.g., based on memory pressure or other factors), then the system adjusts the upper bound of the current between value to introduce another data scan. For example, if the data contains 30M distinct values in a partitionable column, the system might first attempt to partition the data with a range from zero to 15M (as this moves the number of scans from one to two). Then, if after processing N more records the system determines that further partitioning is warranted, the system may attempt to partition 0 to 10M (moving the potential number of scans from two to three). The system continues in this manner for each partition, until all of the records specified for the query have been processed.

In some embodiments, the scalable analysis system implements the second phase of a classic hash-based approach on top of this scheme. For each partition, the system processes data within the partition to determine the number of distinct values or other operation specified by the query. The system may include an object model that provides the BETWEEN operator described above. To simplify the model and interactions, the system may default to creating the BETWEEN values for a WHERE clause on partitionable columns. As results are completed for each partition, the system may provide the partial results to the consumer or internally store the results for combination with those of other partitions to provide a unified final result.

FIG. 1 is a diagram that graphically illustrates the first phase of the scanning performed by the scalable analysis system, in one embodiment. The diagram includes a timeline from top to bottom that shows a first time 110, a second time 120, a third time 130, and a fourth time 140 during the processing of the system. At the first time 110, the system begins the scan, initially assuming that the entire dataset can be processed in one pass without exceeding the memory budgeted for the operation. At the second time 120, the system detects memory processor and partitions the data so that the first scan includes half of the dataset. At the third time 130, the system still detects memory pressure and further partitions the data so that the first can includes the first third of the dataset. At the fourth time 140, the first scan has completed, and the system begins processing of the second partition that includes the remaining two-thirds of the dataset. In the example illustrated, the system is able to complete processing of the second partition without detecting memory pressure and thus without further partitioning the second partition. The data coverage 150 of each pass is illustrated, showing that the first partition covered records zero to 10M and the second partition covered records 10M to 30M. Typically, this kind of split indicates that the data in the first partition was more skewed in value than that in the second partition.

Figure 2:
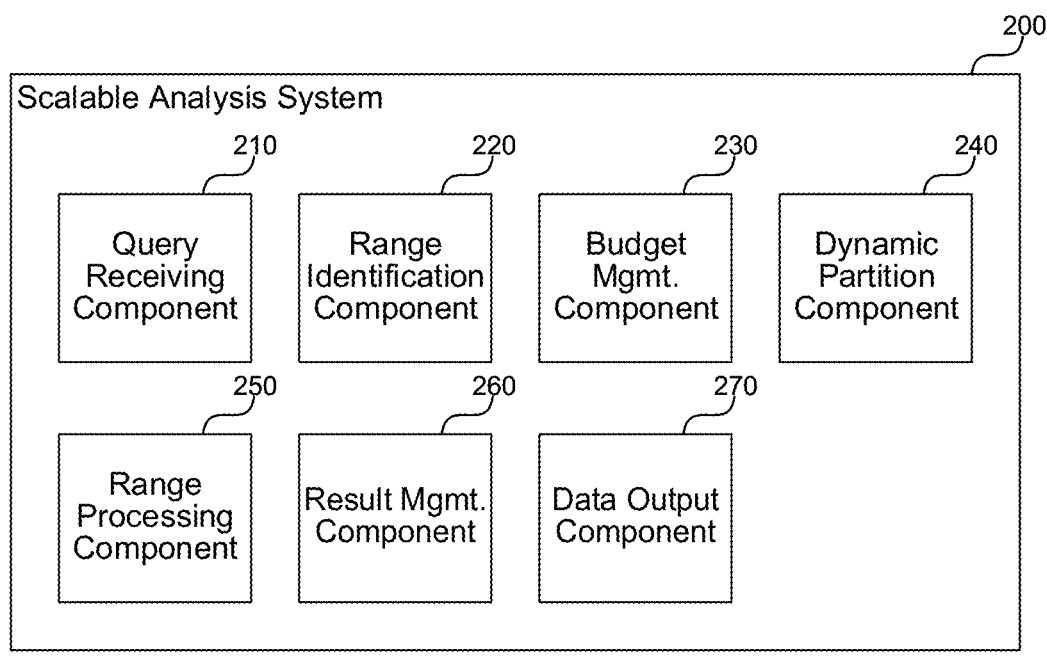
FIG. 2 is a block diagram that illustrates components of the scalable analysis system, in one embodiment.

FIG. 2 is a block diagram that illustrates components of the scalable analysis system, in one embodiment. The system 200 includes a query receiving component 210, a range identification component 220, a budget management component 230, a dynamic partition component 240, a range processing component 250, a result management component 260, and a data output component 270. Each of these components is described in further detail herein.

The query receiving component 210 receives from a requestor a database query that operates over a target range of data. The component 210 may receive the query through a user interface, application-programming interface, or other interface provided by the system 200 for accessing data stored in a database. The database may include one or more servers and data storage devices that store data, as well as one or more software modules that implement various internal and external operations performed by the database. Database implementation is well known in the art and is not explicitly covered here except where helpful to better understand the operation of the system 200. The query receiving component 210 may include a standard database query engine augmented to receive certain new operators, such as the BETWEEN operator described herein, and to identify information about data that is the subject of the query, such as partitionable columns described herein. The query receiving component 210 may receive a query in structured query language or any other format suitable for accessing a database as described herein.

The range identification component 220 identifies an initial range related to the target range over which to partition the data for a first pass to perform the received query. For example, if the query does not include an explicit indication of ranges, such as a BETWEEN operator specified by the requestor, then the system may identify the total range of data identifiers (e.g., row identifiers) affected by the query, and divide the data identifiers initially into a partition that includes the whole target range of data. In other words, the component 220 initially optimistically assumes that the entire target range can be processed in one pass without exceeding resource budget threshold for the operation. The system 200 may also invoke the range identification component 220 to identify remaining ranges of data in subsequent passes after dynamic partitioning, described further below, has occurred.

The budget management component 230 receives a resource budget threshold that defines a limit of permissible resource usage by the received query. The system 200 attempts to process the query quickly and efficiently, while staying within the received resource budget threshold. The component 230 may receive a budget that includes one or more resources along with thresholds for each. For example, the resources may include memory usage, central processing unit (CPU) load, disk usage, whether or not paging to disk is allowed, or any other resource related budget relevant to the query operation. In some cases, the system 200 may automatically define resource budgets in a manner that is not user configurable, while in other cases the system 200 may receive one or more thresholds from an administrator or from the query requestor. This allows any of the database manufacturer, system administrators, and users to be involved in the control of resource usage as specific needs of a particular implementation demand. The budget management component 230 may receive the resource budget(s) as part of the query or during an earlier configuration process (e.g., when the database is first set up).

The dynamic partition component 240 monitors resource usage by the database during processing of the received query, compares the monitored usage to the received resource budget threshold, and dynamically partitions a current range of data being processed to identify a subset of data that can be handled within the received budget threshold. The current range of data being processed when partitioning occurs may include the identified initial range of data or a subsequent partition being processed by the range processing component 250. The dynamic partition component 240 can use a variety of algorithms and heuristics to determine how to partition individual ranges of data. In some embodiments, the component 240 cuts the range of data to process in half upon the first detection of resource pressure. For example, if the system 200 initially attempts to optimistically process the entire target range of data and begins to notice that memory usage is exceeding a budget threshold, then the system may cut the target range in half, processing each half individually. If pressure does not ease sufficiently, the component 240 may again partition the current range further. For example, the component 240 may reduce the data to one-third of the target range, or may use a binary approach to cut the data in half again. In some embodiments, the system 200 provides configurable parameters for determining how the data range is partitioned when the system 200 detects resource pressure.

In some embodiments, the dynamic partition component 240 makes partitioning decisions that only affect the current range of data. In other words, even though the component 240 determines that one-third or one-fourth of the target range of data will be processed in a particular pass, this does not necessarily mean that the remaining data will be divided in the same amounts. The system 200 can dynamically make such decisions as those rows are processed. For example, it is entirely possible that a first one-fourth of the data is processed in a first pass and that a remaining three-quarters of the data is processed in a second pass with no further divisions of the second partition. Thus, the number of partitions of any given range of data can be more a factor of cardinality/skew or other properties of the data and how those properties affect resource usage than by any artificially imposed condition.

The range processing component 250 performs the received query on individual partition ranges identified by the dynamic partition component 240. For example, if the dynamic partition component divides the target range into partitions comprising a first one-third, and a latter two-thirds of the target range, then the range processing component 250 performs the query first on the initial one-third and then later on the latter two-thirds of the target range. Note that at any time as the component 250 is processing the range, the system 200 may determine, via the dynamic partition component 240, that the data will be further partitioned to stay within a budgeted resource level. For example, the resource level may ensure that a threshold level of memory is not exceeded by the operation that would lead to paging memory to disk, which can dramatically slow the speed of processing the query.

The result management component 260 merges one or more processing results of individual partition ranges generated by the range processing component 250. The processing of each partition will produce results, and if there is more than one partition used to process a particular target range of data specified by a query, then those results will typically need to be merged to generate a correct query result. For example, if the query performs a distinct count across many rows of data that are processed in two partitions, then the result management component 260 combines the results of processing the first partition with those of processing the second partition to identify distinct data values across the entire target range of the data set specified by the query. To give a more concrete example, assume that the query is designed to determine a dollar amount of goods sold to each continent during a month and the rows of data represent individual sales transactions. If the system processes the data set in two partitions, the first partition may indicate $20,000 of sales to North America and $10,000 of sales to Europe, and the second partition may indicate $15,000 of sales to North America and $7,000 of sales to Europe. To get a correct result of the query, since the requestor is not interested in the partitioning scheme used by the system 200 to efficiently process data, the result management component 260 adds the results of processing the two partitions to correctly report a total of $25,000 of sales to North America and $17,000 of sales to Europe.

The data output component 270 provides a query result to the requestor in response to the query. The query result includes rows or other data resulting from processing the entire target range. The data output component 270 responds to the requestor in a manner consistent with how the request was received. For example, if the system 200 received the query though a user interface provided by the system 200, then the data output component 270 reports the results to the user interface. Similarly, if the request came through an application-programming interface or network request, then the data output component 270 provides results in kind using the same interface.

The computing device on which the scalable analysis system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
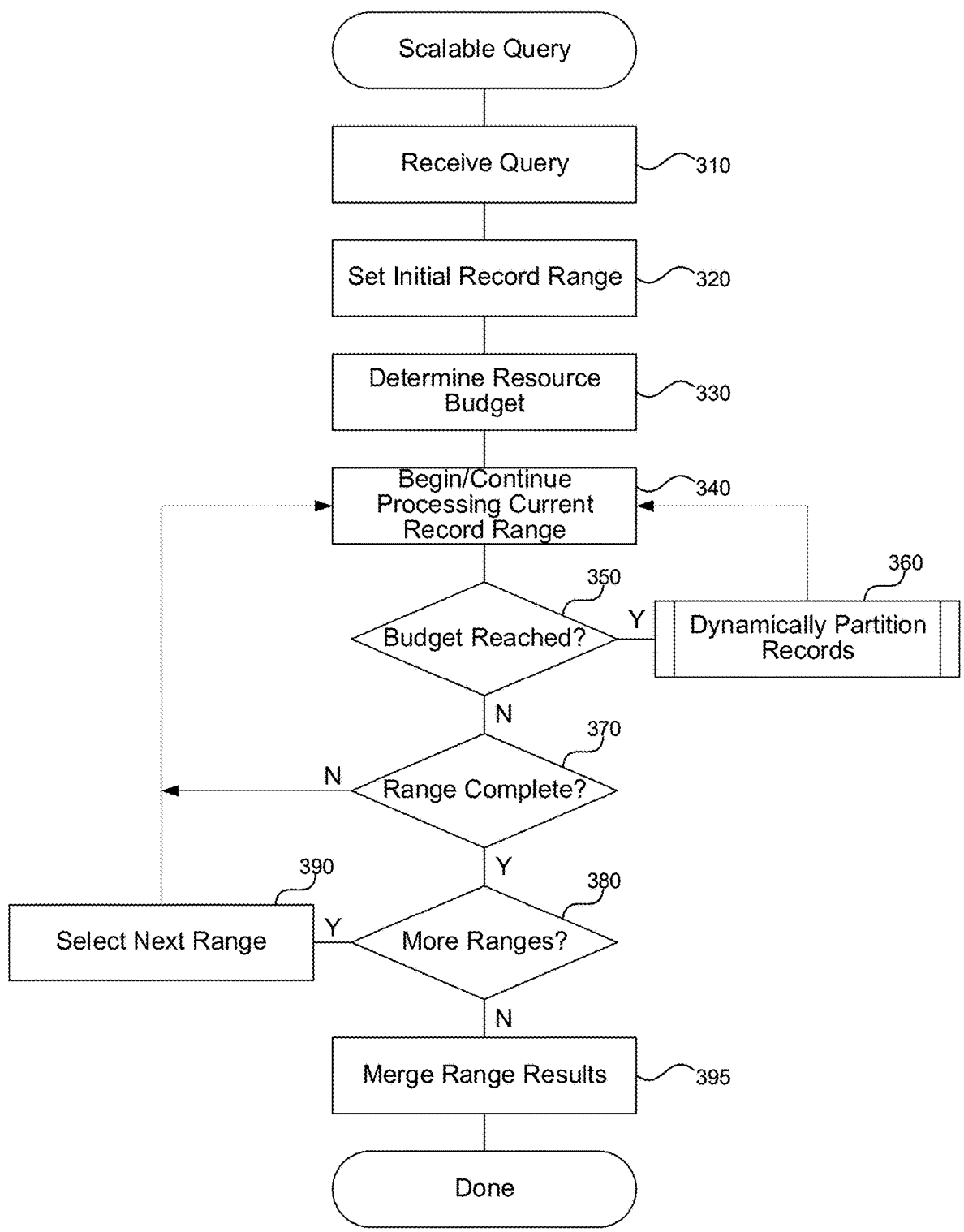
FIG. 3 is a flow diagram that illustrates processing of the scalable analysis system to execute a query efficiently and without exceeding a specified resource budget, in one embodiment.

FIG. 3 is a flow diagram that illustrates processing of the scalable analysis system to execute a query efficiently and without exceeding a specified resource budget, in one embodiment. Beginning in block 310, the system receives a query that requests processing of a data set to produce a query result. For example, the system operating at a database server may receive a query request from one or more client computers over a network. The query specifies one or more columns of the data set or computed columns to return in the query result, as well as any filters that identify portions of the data set of interest to the query requestor. For example, the query may be provided in structured query language in which a SELECT clause specifies the columns to return and a WHERE clause specifies filters that identify portions of the data set. The query may also include computed functions like the COUNT operator or data grouping by including a GROUP BY clause.

Continuing in block 320, the system sets an initial record range to process that includes the entire portion of the data set specified by the query. For example, the system may identify row identifiers of the lowest and highest rows that satisfy the query filters, and add a BETWEEN clause to the query that specifies an upper and lower bound equal to the determined highest and lowest row identifiers, respectively.

Continuing in block 330, the system determines one or more resource budgets that identify a threshold of resource usage to be consumed while processing the query. The system will attempt to manage query processing in a manner that does not exceed the determined resource budgets. The budget may include a limit of memory usage, processing resources, network resources, storage resources, or any combination of resources. The system determines the budgets based on pre-configured settings or information received in association with the query. In some cases, particular client types may have an allowed resource usage or the system administrator may tune the resource budget to prevent paging or other potential performance-robbing events.

Continuing in block 340, the system begins processing the current record range. Based on a cursor indicating the current record and a BETWEEN clause that specifies an upper limit to the range of records to process, the system proceeds with processing each row in the data set until either a budget threshold or the end of the range is reached. In subsequent iterations, the system continues processing the range by selecting the next row in the data set.

Continuing in decision block 350, if the system determines that a budget threshold has been reached, then the system continues at block 360, else the system continues at block 370. In some embodiments, the system samples the current resource usage and compares the usage to the budget thresholds on a periodic schedule. The schedule may include making the determination every N records, every N seconds, or any other metric implemented by the system. Checking the budget more frequently will result in faster partitioning when the budget is close to exhausted, but will also incur more processing to manage the budget. An administrator or system implementer may tune the schedule of checking the resource budgets to achieve an appropriate balance between the computational cost of checking the budget and granularity of decision making when the budget is reached.

Continuing in block 360, the system dynamically partitions the data set to reduce the size of the current range to stay within the determined resource budgets. For example, if the system is currently processing all of the records in one partition, the system may divide the records in half into two partitions, and only process one-half of the record set in the current range. This process is described further with respect to FIG. 4. The system can reduce the current range multiple times, as determined by the data, until a size is reached that can be processed within the budgeted resource constraints. After block 360, the system loops to block 340 to continue processing the resized range of records.

Continuing in decision block 370, if processing of the current range is complete, then the system continues at block 380, else the system loops to block 340 to continue processing the current range. The system can split a query into multiple queries each having a BETWEEN operator that specifies a different range of records. The system processes each range by iterating through the matching records with identifiers between the specified values until the upper bound of the BETWEEN operator is reached.

Continuing in decision block 380, if there are additional ranges to process to satisfy the received query due to dynamic partitioning of the data, then the system continues at block 390, else the system continues at block 395. Continuing in block 390, the system selects the next partition range for processing. In some embodiments, the next range includes all of the remaining records not previously processed. In other words, the system may optimistically assume that the remaining records can be processed within the resource budget without further partitioning. If the assumption proves false as processing continues, then the system will dynamically partition the remaining records to produce additional ranges that will be processed in subsequent iterations. After block 390, the system loops to block 340 to begin processing the selected next range.

Continuing in block 395, the system merges results of processing each partition range to produce a unified response to the received query. The steps used for merging results may vary based on the information requested by the query. For example, if the query requests a count of records, then the merging may include adding counts of records produced by processing each partition. In the event of a requested distinct count, the merging may include determining record distinctness between result sets from each partition, and producing appropriate count totals from there. In some cases, merging simply performs a classic hash approach that operates on a hash table created by the first dynamic partitioning phase. The dynamic portioning phase is fast and scalable, and the second phase can quickly determine distinct counts or perform data grouping from the resulting hash table. After block 395, these steps conclude.

Figure 4:
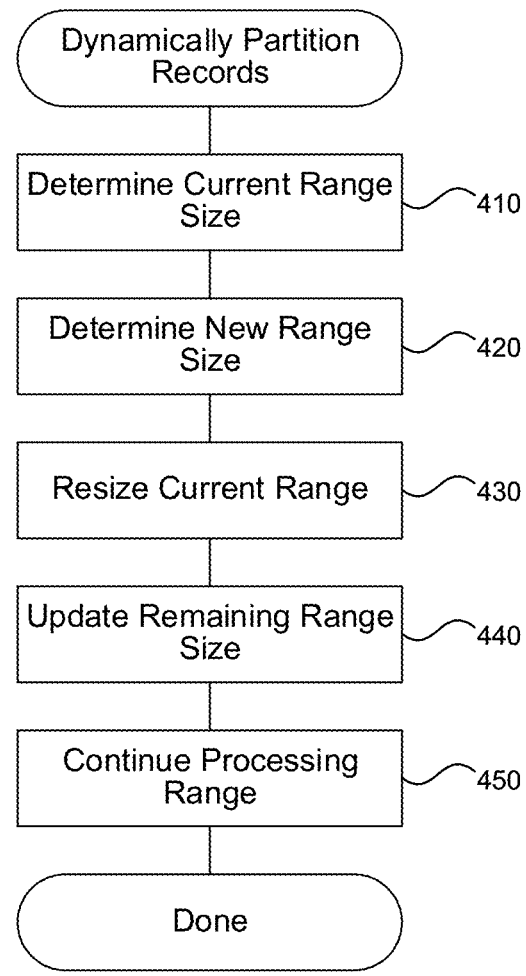
FIG. 4 is a flow diagram that illustrates processing of the scalable analysis to dynamically partition records in a data set while processing a query, in one embodiment.

FIG. 4 is a flow diagram that illustrates processing of the scalable analysis to dynamically partition records in a data set while processing a query, in one embodiment. Typically, these steps occur dynamically while processing a query like the described with reference to FIG. 3. When a budget threshold is reached or soon to be reached, the system dynamically reduces the size of the current set of records being processed, and thus increases the remaining records to be processed. In this way, the system ensures that the processing of each set of records stays within a budgeted set of resource thresholds.

Beginning in block 410, the system determines a current range size of a set of data records being processed. The current range size may include an entire set of records, in the case of no prior attempts to partition the data during query processing, or may include a subset of the entire set of records in the case of prior attempts to partition the data. Determining the current range size informs the system how much partitioning has occurred already so that a smaller partition can be selected.

Continuing in block 420, the system determines a new range size for processing records within a resource budget. For example, the system may cut the prior range size in half, or if the prior range size was already a half of the total range, the system may cut the prior range size to a third of the total range. The system selects a range size that is expected to be processable within a specified resource budget. The system may receive information such as a velocity at which memory usage is increasing to determine how much additional data can be processed within the budget. For some types of operations, such as data grouping, memory velocity is initially larger as new data values are encountered but velocity slows as the data is processed because new values are more rarely encountered.

Continuing in block 430, the system resizes the current processing range based on the determined new range size. In some cases, the system may modify a BETWEEN clause of a query based on the new range size so that an upper bound of record identifiers is reduced to encompass fewer records in the query.

Continuing in block 440, the system updates a remaining range size to include any records excluded from the current range size. The records not processed in the current iteration will be processed in one or more subsequent iterations. The system attempts to divide the data in a manner that will allow processing each iteration within the resource budget. After processing the current range, the system moves on to the remaining records, performing the same type of dynamic partitioning until all records responsive to the query have been processed.

Continuing in block 450, the system continues processing the resized current range until either the resource budget is again constrained or all records in the range have been processed. The system may perform additional partitioning by further reducing the current range size as needed to process the current iteration within the resource budget, as shown further with reference to FIG. 3. After block 450, these steps conclude.

In some embodiments, the scalable analysis system checks the current resource usage against a budgeted resource usage every N records. The system can check the budget according to a variety of heuristics, including dynamically determining the check frequency as the data is processed. For example, the system may initially check memory pressure frequently, but if no pressure is detected or memory velocity (the rate of increase in memory usage) is low, the system may schedule the next check for further out (e.g., wait more records). The system attempts to select N so that the processing of the budget is not itself a strain on computational resources, while keeping the value low enough to detect memory or other resource pressure early.

In some embodiments, the scalable analysis system produces a data cache using the dynamic partitioning steps described herein and then performs additional operations to finalize the query results on the resulting data cache. In many database query implementations, it is undesirable to perform complex operations on the first phase data cache because the data cache is potentially large. The data cache produced by the dynamic partitioning method described herein is reasonable enough in size that operations (such as determining a distinct count or grouping) can be performed efficiently against the data cache. Thus, by generating the data cache efficiently and then processing the data cache efficiently to generate the desired query result, the system makes the whole operation efficient and scalable.

In some embodiments, the scalable analysis system performs parallel processing of dynamically partitioned ranges. Because each range operates on an independent set of records, the system can process each range in parallel. Thus, as the system divides the data into partitions, the system may go ahead and begin processing some partitions at the same time is others when appropriate computing resources are available (e.g., additional processors) to more efficiently complete the whole operation.

In some embodiments, the scalable analysis system does not perform the dynamic partitioning method unless the table against which the query is executed exceeds a threshold size. For small tables, the complexity of the dynamic partitioning is unnecessary and may not produce a noticeable benefit. Thus, the system may establish a threshold up to which a naïve or straightforward approach to the query is used, and only use the dynamic partitioning method for larger tables. In some embodiments, the system may start processing all queries using a naïve approach and then switch to a dynamic partitioning approach as resources come under pressure during processing of the query.

From the foregoing, it will be appreciated that specific embodiments of the scalable analysis system have been described herein for purposes of illustration, but that various modifications may be made without deviating from the spirit and scope of the invention. Accordingly, the invention is not limited except as by the appended claims.

We claim:

1. A computer-implemented method for data set processing, the method comprising:
    in response to a determination that a resource usage threshold has been reached while processing records of a data set using a processing range of a first size, dynamically reducing the processing range to a second size that is less than the first size, wherein the second size is based at least in part on a quantity of records expected to be processable within a resource budget;
    processing a first subset of the records with the processing range of the second size;
    processing a second subset of the records with the processing range of the second size, wherein the second subset of the records does not overlap with the first subset of the records; and
    merging results of the processing of the first subset with results of the processing of the second subset.

2. The method of claim 1, wherein the determination that the resource usage threshold has been reached comprises receiving information describing a velocity at which memory usage is increasing.

3. The method of claim 1, wherein the velocity slows as the data set is processed.

4. The method of claim 1, wherein the records not processed in the first subset or in the second subset are to be processed in one or more other subsets.

5. The method of claim 4, wherein the first subset and second subset represent a partitioning of the data set in a manner that allows processing of the subsets within the resource budget.

6. The method of claim 1, further comprising:
    processing a third subset of the records with the processing range of the second size.

7. The method of claim 1, further comprising:
    determining that the resource usage threshold has been reached while processing the records of the data set using the processing range of the second size; and
    in response to the determining that the resource usage threshold has been reached while processing the records of the data set using the processing range of the second size, further reducing the processing range.

8. A system for processing data set queries, the system comprising:
    at least one processor;
    at least one memory device;
    wherein the at least one memory device and the at least one processor are respectively configured to store and execute instructions for causing the computing device to perform operations, the operations including:
        receiving a request for a query result;
        in response to the request, beginning a processing of the data set using a processing range setting of an initial value;
        determining that a resource usage threshold has been reached in conjunction with the processing of the data set using the processing range setting of the initial value;
        in response to the determining, dynamically partitioning the data set into multiple subsets, a size of the subsets being based at least in part on a quantity of records expected to be processable within the resource usage threshold, wherein the subsets do not overlap with each other;
        processing the multiple subsets; and
        merging results of the processing the multiple subsets into a unified response to the request.

9. The system of claim 8, the initial value represents an entirety of the data set.

10. The system of claim 8, wherein the resource usage threshold represents a memory usage limit for the processing of the dataset.

11. The system of claim 8, wherein the resource usage threshold is based on at least one of pre-configured settings or information received in association with the request.

12. The system of claim 8, wherein the determining that the resource usage threshold has been reached comprises determining that a memory usage velocity will lead to exceeding a budgeted memory usage before a next budget check.

13. The system of claim 8, wherein the determining that the resource usage threshold has been reached comprises sampling a current resource usage and comparing the current usage to the budget thresholds on a periodic schedule.

14. The system of claim 8, wherein the dynamically partitioning comprises dividing the data set into the multiple subsets.

15. The system of claim 8, wherein the dynamically partitioning comprises, after a determination that the resource usage threshold has been reached after a first attempt at dynamic partitioning, performing a second dynamic partitioning.

16. A computer-implemented method for data set processing, the method comprising:
    in response to a determination that a resource usage threshold has been or would be reached while processing records of a data set using a processing range of a first size, dynamically reducing the processing range to a second size that is less than the first size, wherein the second size is based at least in part on a quantity of records expected to be processable; and
    processing a plurality of dynamically partitioned subsets of the records of data in accordance with the processing range of the second size, wherein the dynamically partitioned subsets of the plurality of dynamically partitioned subsets do not overlap with each other.

17. The method of claim 16, wherein the quantity of records expected to be processable is based at least in part on a second order function corresponding to memory usage for data set processing.

18. The method of claim 16, wherein the processing of the plurality of dynamically partitioned subsets includes the processing of a query operation over a first portion of the data set.

19. The method of claim 18, wherein the second size is also based on a memory usage limit for data set processing.

20. The method of claim 16, the method further comprising:
    adding a BETWEEN operator to a WHERE clause for a query.

* * * * *